United States Patent
Popescu et al.

(10) Patent No.: US 7,787,271 B2
(45) Date of Patent: Aug. 31, 2010

(54) POWER SUPPLY START-UP AND BROWN-OUT INRUSH MANAGEMENT CIRCUIT

(75) Inventors: Lucian Popescu, Austin, TX (US); Constantin D. Livescu, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 354 days.

(21) Appl. No.: 11/970,977

(22) Filed: Jan. 8, 2008

(65) Prior Publication Data

US 2009/0174386 A1 Jul. 9, 2009

(51) Int. Cl.
*H02M 5/42* (2006.01)
(52) U.S. Cl. .................... 363/89; 363/60; 361/93
(58) Field of Classification Search .......... 363/66, 363/82, 55, 56.01, 58, 60, 70, 49; 307/66, 307/82, 125, 135, 140, 147; 323/271–276, 323/222, 233, 293, 908; 710/8, 10, 11, 15
See application file for complete search history.

(56) References Cited

U.S. PATENT DOCUMENTS

| | | | |
|---|---|---|---|
| 6,191,676 B1 * | 2/2001 | Gabor | 336/160 |
| 6,445,165 B1 | 9/2002 | Malik et al. | |
| 6,862,201 B2 | 3/2005 | Hodge, Jr. | |
| 2006/0274468 A1 * | 12/2006 | Phadke | 361/93.1 |

* cited by examiner

*Primary Examiner*—Rajnikant B Patel
(74) *Attorney, Agent, or Firm*—Larson Newman & Abel, LLP

(57) ABSTRACT

A power supply device including a diode bridge, a converter module, and an inrush control module. The diode bridge is configured to rectify an input voltage. The converter module is coupled to the diode bridge and is configured to convert the input voltage into a direct current regulated output voltage. The inrush control module is connected to the diode bridge and is configured to gradually activate a transistor and to limit an inrush current peak value based upon a zero crossing being detected in the input voltage. A method for limiting the inrush current peak value is also disclosed.

18 Claims, 5 Drawing Sheets

POWER SUPPLY START-UP AND BROWN-OUT INRUSH MANAGEMENT CIRCUIT

FIELD OF THE DISCLOSURE

This disclosure generally relates to power supplies, and more particularly relates to a system and method for limiting an inrush current in a power supply.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Typically, computer systems rely on switch mode power supplies to assure the hardware interface between the available power sources, such as an alternating current (AC), and the information handling system components. During start-up (first turned 'ON') or after brown-out events (temporary loss of an input voltage), a switch mode power supply may draw an inrush input current. The inrush current can lead to major problems in the switch mode power supplies. The inrush current can over-stress the internal input components and can lead to a safety circuit breaker disconnecting an external electrical power circuit. The inrush current can also momentarily distort the available AC input voltage, generating power grid perturbations that could affect other electronic devices connected to the same AC power source.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
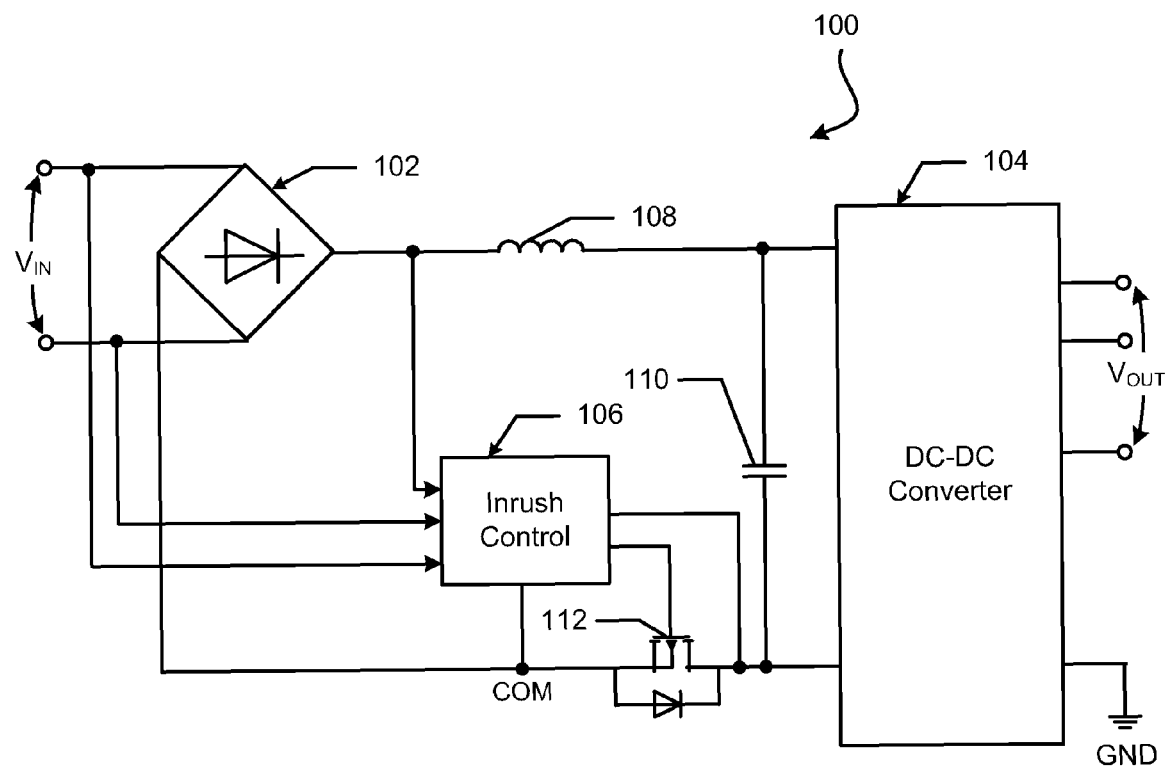
FIG. 1 is a block and schematic diagram of a particular embodiment of a power supply.

FIG. 1 shows an embodiment of a power supply device 100 including a first diode bridge 102, a direct current to direct current (DC-DC) converter module 104, and an inrush control circuit 106. The power supply device 100 can also include an inductor 108, a capacitor 110, and an inrush limiter transistor 112. The inrush limiter transistor 112 can be a low voltage drop semiconductor device, such as a metal-oxide-semiconductor field-effect transistor (MOSFET), an insulated-gate bipolar transistor (IGBT), and the like. The first diode bridge 102 includes first and second terminals connected to a first voltage reference, labeled $V_{IN}$, a third terminal, and a fourth terminal. The DC-DC converter module 104 includes a first input terminal coupled to the third terminal of the first diode bridge 102 and a second input terminal coupled to the fourth terminal of the first diode bridge. The DC-DC converter module 104 can also include first, second and third output terminals coupled to a second voltage reference, labeled $V_{OUT}$, and a fourth output terminal coupled to a third voltage reference, labeled GND.

The inrush control circuit 106 includes a first input terminal connected to the third terminal of the first diode bridge 102, a second input terminal connected to the second terminal of the first diode bridge, and a third input terminal connected to the first terminal of the first diode bridge. The inrush control circuit 106 can also include an output terminal and a fourth input terminal connected to the third voltage reference. The inductor 108 includes a first terminal connected to the third terminal of the first diode bridge 102 and a second terminal connected to the first input terminal of the DC-DC converter module 104. The capacitor 110 includes a first terminal connected to the second terminal of the inductor 108 and a second terminal coupled to the fourth terminal of the first diode bridge 102. The inrush limiter transistor 112 includes a control electrode connected to the first output terminal of the inrush control circuit, a first current electrode connected to the fourth terminal of the first diode bridge 102, and a second current electrode connected to the second terminal of the capacitor 110.

The first diode bridge 102 preferably receives an input voltage, and rectifies the input voltage. The inductor 108 filters any electronic noise in the input voltage generated by the power supply device 100. The inrush control circuit 106 can receive the input voltage and monitor the input voltage for a zero crossing. In an AC voltage, such as the input voltage, the zero crossing is the point when no voltage is present. The inrush control circuit 106 can also monitor a bulk voltage measured across the capacitor 110. Upon detecting the zero crossing, the inrush control circuit 106 can send a control signal to the control electrode of the inrush limiter transistor 112. The inrush control circuit 106 can gradually activate the inrush limiter transistor 112 by increasing the voltage level of the control signal based on a voltage difference between the bulk voltage and the input voltage. Gradually activating the inrush limiter transistor 112 decreases an impedance level of the inrush limiter transistor allowing current to flow through the inductor 108, the capacitor 110, and the inrush limiter transistor.

Upon activation of the inrush limiter transistor 112, the rectified input voltage can be applied to the DC-DC converter module 104. The capacitor 110 filters the rectified input voltage into an unregulated bulk voltage. The bulk voltage is further supplied to the DC-DC converter module 104, which regulates multiple, isolated DC output voltages for various components attached to the power supply device 100.

During operation of the power supply 100, the inrush control circuit 106 can minimize an inrush current to prevent saturation of the inductor 108 and to prevent damage to the power supply. The inrush current is a surge of current drawn by the power supply device 100 when the power supply device is first activated. The power supply 100 can also draw the inrush current after a brown-out event, which is when the voltage level is zero for an extended amount of time. At start-up or during brown-out events, the inrush control circuit 106 can be reset and the inrush limiter transistor 112 can be deactivated until the next zero crossing of the input voltage is detected. Upon detecting the zero crossing, the inrush control circuit 106 can gradually activate the inrush limiter transistor 112 to maintain the inrush current peak value at a minimum and to charge the capacitor 110 during a few half-cycles of the input voltage.

At start-up, the bulk voltage is typically zero because the capacitor 110 does not have a stored energy. Thus, the voltage difference between the input voltage and the bulk voltage is such that the inrush control circuit 106 can activate the inrush limiter transistor 112 and reduce the impedance of the limiter circuit. The inrush current can be minimized by activating the inrush limiter transistor 112 at the zero crossing, because the input voltage is zero at the zero crossing and as a result there is not an inrush current. As the inrush limiter transistor is gradually activated, the capacitor 110 continues to be charged and the potential to saturate the inductor 108 is reduced.

Upon detection of a brown-out event, the inrush control circuit 106 deactivates the inrush limiter transistor 112 to prevent the flow of current in the power supply 100. The inrush control circuit 106 monitors the input voltage for the next zero crossing after the brown-out. Based on the voltage difference between the bulk voltage and the input voltage, the inrush control circuit modulates the impedance of the inrush limiter transistor 112 by gradually activating the inrush limiter transistor. Thus, by detecting the zero crossing upon start-up and upon a brown-out event, by measuring the bulk voltage, and by gradually activating the inrush limiter transistor 112, the inrush control circuit 106 can limit the inrush current drawn by the power supply device 100 and prevent saturation of the inductor 108.

Figure 2:
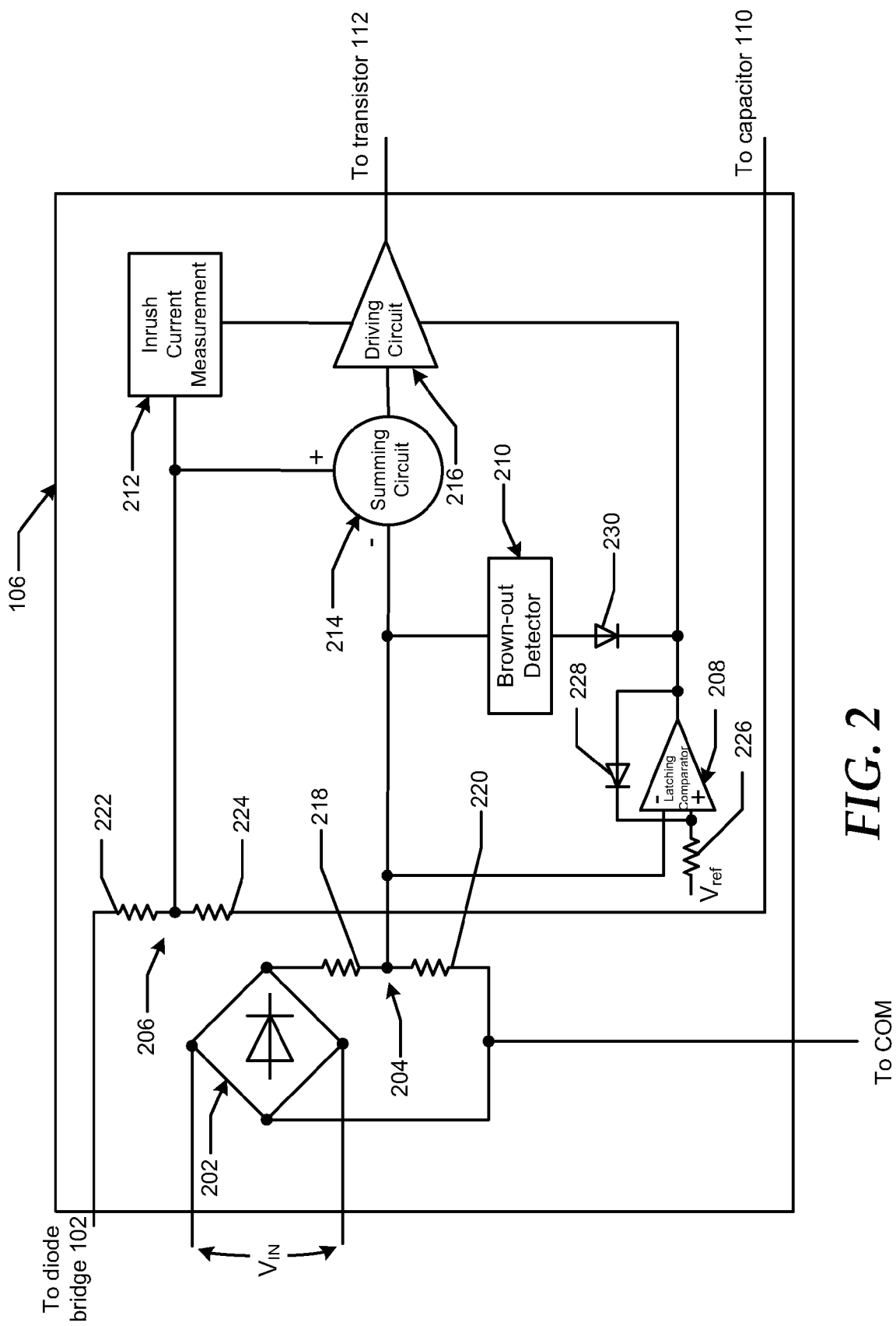
FIG. 2 is a block and schematic diagram of a particular embodiment of an inrush control circuit of the power supply.

FIG. 2 shows a particular embodiment of the inrush control circuit 106 in greater detail including a second diode bridge 202, first and second resistor networks 204 and 206, a latching comparator 208, and a brown-out detector 210. The inrush control circuit 106 also can include an inrush current measurement circuit 212, a summing circuit 214, and a driving circuit 216. The second diode bridge 202 includes first and second terminals connected to the first voltage reference, $V_{IN}$, a third terminal, and a fourth terminal connected to the third voltage reference, labeled COM. The first resistor network 204 includes first and second resistors 218 and 220. The first resistor 218 has a first terminal connected to the third terminal of the second diode bridge 202 and a second terminal. The second resistor 220 has a first terminal connected to the second terminal of the first resistor 218 and a second terminal connected to the third voltage reference.

The second resistor network 206 includes third and fourth resistors 222 and 224. The third resistor 222 includes a first terminal connected to the third terminal of the first diode bridge 102 of FIG. 1, and a second terminal. The fourth resistor 224 includes a first terminal connected to the second terminal of the third resistor 222 and a second terminal connected to the second terminal of the capacitor 110 of FIG. 1. The latching comparator 208 includes a first input terminal connected to the second terminal of the first resistor 218, a second input terminal coupled to a fourth voltage reference, labeled VREF, and an output terminal. The inrush control circuit 106 can also include a fifth resistor 226, a second diode 228, and a third diode 230. The fifth resistor includes a first terminal connected to the second input terminal of the latching comparator 208 and a second terminal connected to the fourth voltage reference. The second diode 228 includes a first terminal connected to the second input terminal of the latching comparator 208 and a second terminal connected to the output terminal of the latching comparator.

The brown-out detector 210 has an input terminal connected to the second terminal of the first resistor 218, and an output terminal. The third diode 230 has a first terminal connected to the output terminal of the latching comparator 208 and a second terminal connected to the output terminal of the brown-out detector 210. The inrush current measurement circuit 212 has an input terminal connected to the second terminal of the third resistor 222 and an output terminal. The summing circuit 214 has a first input terminal connected to the second terminal of the first resistor 218, a second input terminal connected to the second terminal of the third resistor 222 and an output terminal. The driving circuit 216 includes a first input terminal connected to the output terminal of the summing circuit 214, a second input terminal connected to the output terminal of the inrush current measurement circuit 212, a control terminal connected to the output terminal of the latching comparator 208, and an output terminal connected to the control terminal of the inrush limiter transistor 112 of FIG. 1.

The second diode bridge 202 preferably receives the input voltage, rectifies the input voltage, and supplies the rectified voltage to the first resistor network 204. Based on a resistive ratio between the first resistor 218 and the second resistor 220, the first resistor network 204 can scale down the rectified input voltage for use by the components of the inrush control circuit 106. Similarly, based on the resistive ratio between the third resistor 222 and the fourth resistor 224, the second resistor network 206 can scale down the bulk voltage received at the first terminal of the third resistor.

The latching comparator 208 can monitor the rectified input voltage to determine the zero crossing of the input voltage. In an embodiment, the fourth voltage reference can be a voltage near zero. Based upon the voltage level of the rectified input voltage and the voltage level of the fourth voltage reference being the same voltage level, the latching comparator 208 outputs an enable signal to the driving circuit 216. The enable signal can be a constant voltage level, such that the driving circuit 216 is activated. After detecting the zero crossing in the input voltage, a feedback loop through the second diode 228 can allow the latching comparator 208 to continuously output the enable signal to the driving circuit 216 until the latching comparator is reset. The second diode 228 can allow current to flow from the output of the latching comparator 208 through the feedback loop to the second terminal of the latching comparator and not allow current to flow from the second terminal to the output terminal.

The brown-out detector 210 monitors the input voltage and measures the length of time that the voltage level of the input voltage is zero. If the voltage level of the input voltage is zero longer than a pre-determined length of time, the brown-out detector resets the latching comparator 208 and the driving circuit 216. The third diode 230 prevents the enable signal of the latching comparator 208 from being transmitted to the brown-out detector 210. The inrush current measurement circuit 212 can continuously monitor the input current charging the capacitor 110 of FIG. 1. Based on a slew rate of the bulk voltage, the inrush current measurement circuit 212 can output an inrush current limiting signal to the driving circuit 216. The slew rate is the rate of change for the bulk voltage. The inrush current measurement circuit 212 can continuously change the inrush current limiting signal, based on the calculated slew rate of the bulk voltage.

The summing circuit 214 can determine a momentary voltage level difference between the input voltage and the bulk voltage, and can output the voltage difference to the driving circuit 216. Based on the voltage changes of the input voltage and the bulk voltage, the summing circuit 214 can continuously update the output voltage sent to the driving circuit 216. Based on the inrush current limiting signal, the output voltage, and the enable signal, the driving circuit 216 can output a control signal to the inrush limiter transistor 112 of the inrush limiter circuit 116 of FIG. 1. Depending on the inrush current limiting signal and the output voltage, the driving circuit 216 can continuously change the voltage level of the control signal.

Therefore, during operation of the inrush control circuit 106, the second diode bridge 202 can receive and rectify the input voltage. The first resistor network 204 can scale down the rectified input voltage, which can be applied to the latching comparator 208, the brown out detector 210, and the summing circuit 214. The latching comparator 208 can determine the zero crossing of the input voltage by comparing the input voltage to the fourth voltage reference. Upon the input voltage being equal to the fourth voltage reference, the latching comparator 208 can output the enable signal to activate the driving circuit 216. Based on the slew rate of the bulk voltage, the inrush current measurement circuit 212 can output a continuously changing inrush current limiting signal to the driving circuit 216. The summing circuit 214 can determine the momentary voltage level difference between the input voltage and the bulk voltage, and output the voltage level difference to the driving circuit 216. Based on the inrush current limiting signal and the voltage level difference, the driving circuit 216 can output a continuously changing control signal to the inrush limiter transistor 112 of FIG. 1. The control signal can change the impedance of the inrush limiter transistor 112, thus changing the amount of current that is able to flow through the inrush limiter transistor and the capacitor 110. As the voltage level of the control signal is increased the impedance of the inrush limiter transistor 112 and the limiter circuit 116 is reduced and more current is able to flow through the power supply device 100. Gradually reducing the impedance of the inrush limiter transistor 112 and the inrush limiter circuit 116 limits the inrush current that can flow through the power supply device 100. Based on a brown-out event, the brown-out detector 210 can deactivate the driving circuit 216 and reset the latching comparator 208. After the latching comparator 208 is reset, the components of the inrush control circuit 106 can again perform the functions as stated above to limit the inrush current and prevent saturation of the inductor 108.

In another embodiment the inrush control circuit 106 can perform the same functions to control the control signal transmitted to the inrush limiter transistor 112 of the inrush limiter circuit, but can be implemented with a dedicated Application Specific Integrated Circuit (ASIC).

Figure 3:
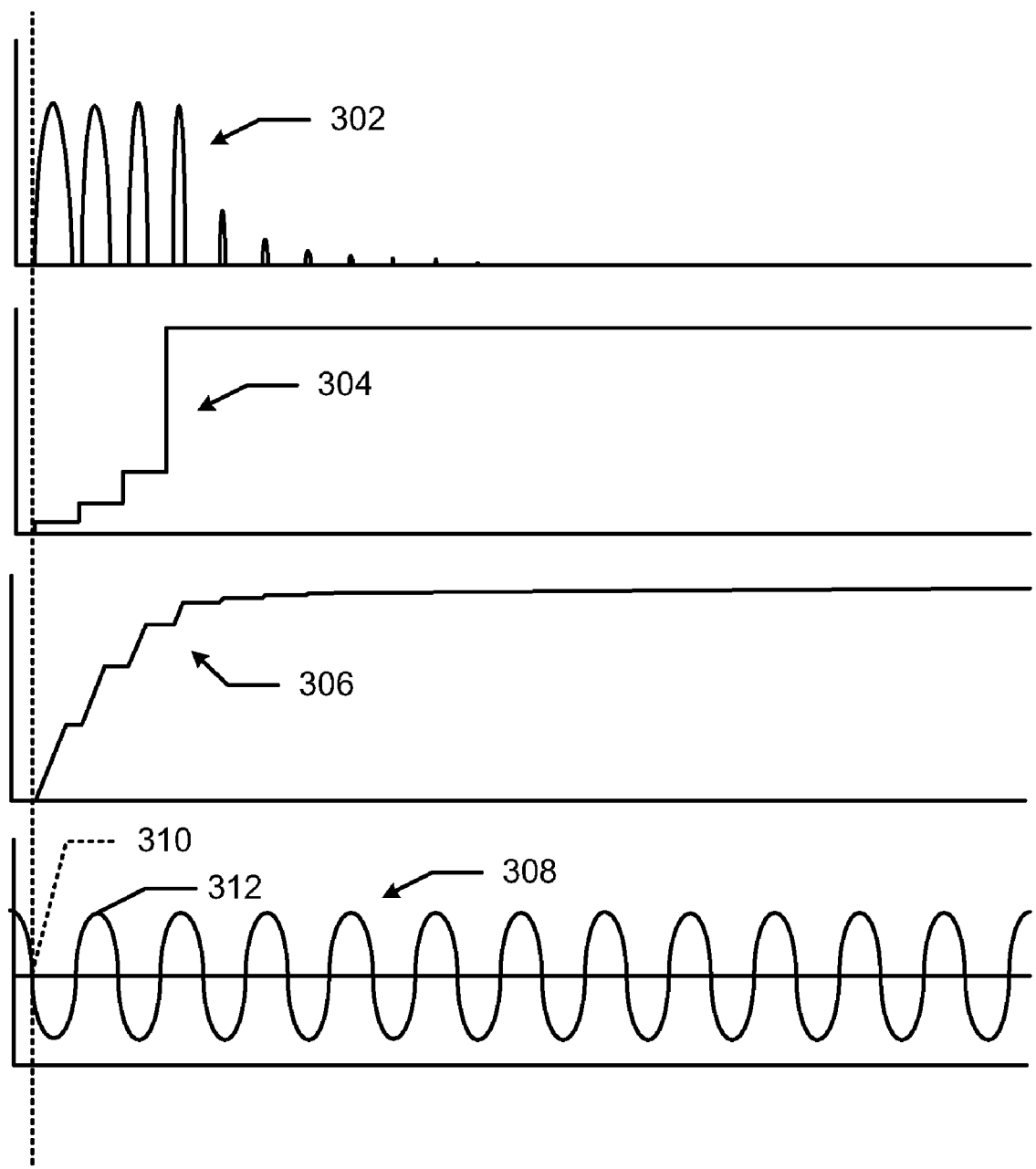
FIG. 3 is a graph of a plurality of waveforms associated with the inrush control circuit.

FIG. 3 shows a particular embodiment of a plurality of waveforms 302, 304, 306, and 308 associated with the inrush control circuit 106 of FIGS. 1 and 2. The waveform 302 represents a rectified input current, an inrush current, through the inrush limiter transistor 112. The waveform 304 represents the control signal applied by the inrush control circuit 106 to the control electrode of the inrush limiter transistor 112. The waveform 306 represents the bulk voltage measured across the capacitor 110. The waveform 308 represents the input voltage applied to the first diode bridge 102 and the inrush control circuit 106. The inrush control circuit activates the inrush limiter transistor 112 at a first zero crossing 310 of the input voltage 308. Upon the first zero crossing 310 of the input voltage 308, the inrush control circuit gradually increases control signal 304 and the bulk voltage 306 increases according to the increase of the control signal. The inrush current 302 is minimized by the inrush control circuit 106 activating the inrush limiter transistor 112 at the zero crossing 310 instead of when the input voltage 308 is at a ninety degree phase 312. If the inrush control circuit 106 activated the inrush limiter transistor 112 when the input voltage 308 is at the ninety degree phase 312 the inrush current 302 would spike causing the potential saturation of the inductor 108 and potential damage to the power supply 100. Thus, by monitoring the input voltage 308, the inrush control circuit 106 can limit the inrush current 302.

Figure 4:
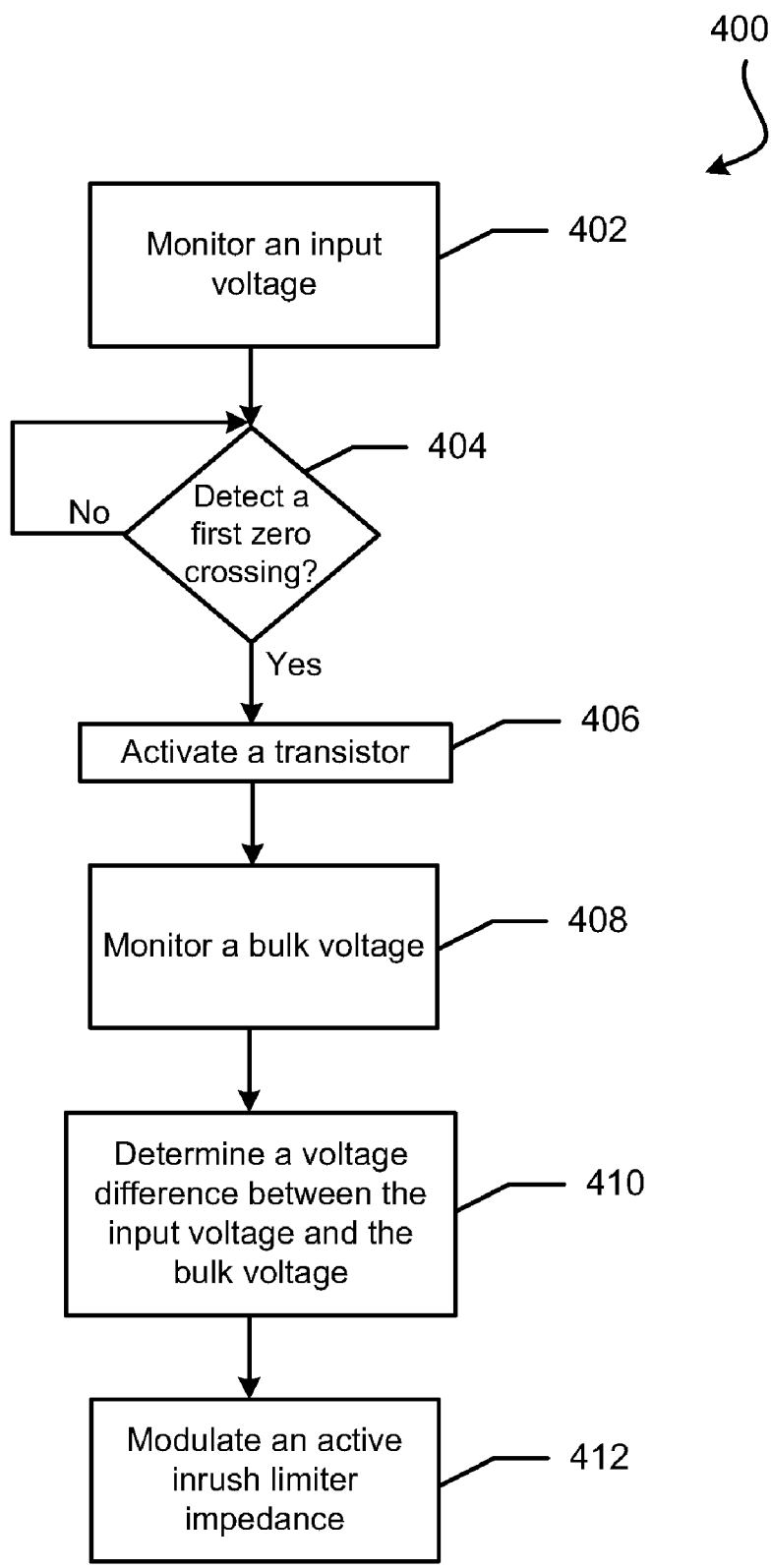
FIG. 4 is a flow diagram of a method for minimizing an inrush current upon startup of the power supply.

FIG. 4 shows a flow diagram of a method 400 for minimizing an inrush current upon startup of the power supply. At block 402, the inrush control circuit monitors an input voltage. The inrush control circuit waits for a zero crossing of the input voltage to be detected at block 404. At block 406, if the zero crossing is detected, the inrush control circuit activates an inrush limiter transistor. The inrush control circuit also monitors a bulk voltage at block 408. At block 410, the inrush control circuit determines a voltage difference between the input voltage and the bulk voltage. The inrush control circuit modulates an active inrush limiter impedance based on the activation level of the inrush limiter transistor at block 412.

Figure 5:
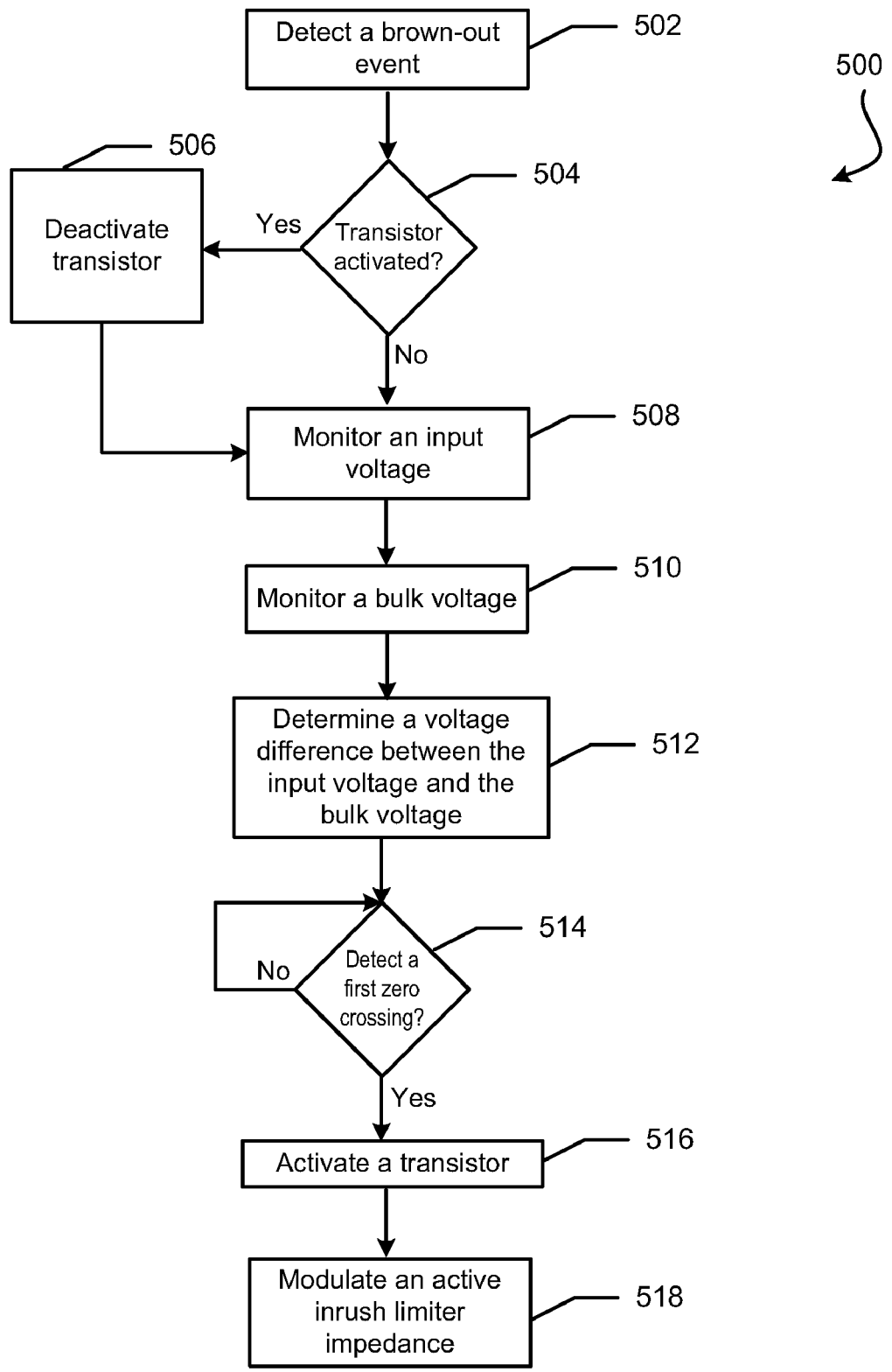
FIG. 5 is a flow diagram of a method for minimizing the inrush current upon detecting a brown-out event in the power supply.

FIG. 5 shows a flow diagram of a method for minimizing the inrush current upon brown-out of the power supply. At block 502, the inrush control circuit waits for the detection of a brown-out event. Upon the brown-out event being detected, the inrush control circuit determines whether the inrush limiter transistor is activated at block 504. At block 506, if the inrush limiter transistor is activated, the inrush control circuit deactivates the inrush limiter transistor. If the inrush limiter transistor is not activated, the inrush control circuit monitors an input voltage at block 508. The inrush control circuit also monitors a bulk voltage at block 510. At block 512, the inrush control circuit determines a voltage difference between the input voltage and the bulk voltage. The inrush control circuit waits for a zero crossing of the input voltage to be detected at block 514. At block 516, if the zero crossing is detected, the inrush control circuit activates an inrush limiter transistor. The inrush control circuit modulates an active inrush limiter impedance based on the activation level of the inrush limiter transistor at block 518.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A power supply device comprising:
a diode bridge including first and second terminals coupled to a voltage reference, a third terminal, and a fourth terminal, the diode bridge configured to rectify an input voltage;
a converter module including a first terminal coupled to the third terminal of the diode bridge and a second terminal coupled to the fourth terminal of the diode bridge, the converter module configured to convert the input voltage into a direct current regulated output voltage;
an inrush control module including a first terminal coupled to the third terminal of the diode bridge, a second terminal coupled to the second terminal of the diode bridge, and a third terminal coupled to the first terminal of the diode bridge, the inrush control module configured to gradually activate a transistor and to limit an inrush current peak value based upon a zero crossing being detected in the input voltage; and
an inrush limiter circuit including:
the transistor having a first current electrode connected to the fourth terminal of the diode bridge, a second current electrode connected to the second terminal of the converter module, and a control electrode connected to an output terminal of the inrush control module, the transistor configured to vary an impedance of the inrush limiter circuit based on a driving signal received from the inrush control module.

2. The power supply device of claim 1 wherein the inrush control module is further configured to prevent saturation of a boost inductor.

3. The power supply device of claim 1 wherein the inrush control module is further configured to change an impedance level of the transistor based on a voltage difference between the input voltage and a bulk voltage.

4. The power supply device of claim 1 wherein the inrush control module is further configured to deactivate the transistor based upon a brown-out event being detected.

5. The power supply device of claim 4 wherein the inrush control module is further configured to gradually reactivate the transistor based upon a post brown-out zero crossing being detected in the input voltage after the brown-out event.

6. The power supply device of claim 5 wherein the inrush control module is further configured to limit the inrush current upon the detection of the brown-out event.

7. The power supply device of claim 5 wherein the inrush control module is further adapted configured to prevent the saturation of a boost inductor upon the detection of the brown-out event.

8. A power supply device comprising:
a diode bridge including first and second terminals coupled to a first voltage reference, a third terminal, and a fourth terminal, the diode bridge configured to rectify an input voltage;
a latching comparator including a first input terminal coupled to the third terminal of the diode bridge, a second input terminal coupled to a second voltage reference, and an output terminal, the latching comparator configured to output an enable signal based on a zero crossing of the input voltage;
an inrush current measurement circuit including an input terminal coupled to the third terminal of the diode bridge, and an output terminal, the inrush current measurement circuit configured to output an inrush current limiting signal based on a slew rate of a bulk voltage;
a driving circuit including a first input terminal coupled to the third terminal of the diode bridge, a second input terminal connected to the output terminal of the inrush current measurement circuit, a control terminal connected to the output terminal of the latching comparator, and an output terminal, the driving circuit configured to output a driving voltage based on the enable signal, the inrush current limiting signal, and a voltage difference between the input voltage and a bulk voltage;
an inrush limiter circuit including:
a transistor having a first current electrode coupled to the second terminal of the diode bridge, a second current electrode, and a control electrode coupled to the output terminal of the driving circuit, the inrush limiter circuit configured to limit an inrush current based on the driving voltage; and
a summing element including a first input terminal coupled to the third terminal of the diode bridge, a second input terminal coupled to the input terminal of the inrush current measurement circuit, and an output terminal coupled to the first input terminal of the driving circuit, the summing element configured to output a voltage signal to the driving circuit based on the voltage difference between the input voltage and the bulk voltage.

9. The power supply device of claim 8 wherein the inrush limiter circuit is further configured to prevent saturation of a boost inductor.

10. The power supply device of claim 8 further comprising:
a brown-out detector module coupled to the third terminal of the diode bridge and an output terminal coupled to the output terminal of the latching comparator, the brown-out detector configured to deactivate the inrush limiter circuit and to reset the driving circuit based on detecting a brown-out event in the input voltage.

11. The power supply device of claim 10 wherein the latching comparator is further configured to reactivate the driving circuit based upon a post brown-out zero crossing of the input voltage being detected.

12. The method of claim 11 wherein the driving circuit is further configured to reactivate the inrush limiter circuit based on the voltage difference between the input voltage and the bulk voltage upon the post brown-out zero crossing being detected.

13. A method comprising:
monitoring an input voltage and a bulk voltage;
detecting a first zero crossing of the input voltage;
determining a voltage difference between the input voltage and the bulk voltage; and
modulating an inrush limiter impedance to limit an inrush current based on the voltage difference, based on the first zero crossing, and based on a driving signal received from an inrush control module.

14. The method of claim 13 further comprising:
preventing saturation of a boost inductor based on the inrush limiter impedance.

15. The method of claim 13 further comprising:
detecting a brown-out event;
detecting a second zero crossing of the input voltage;
determining the voltage difference between the input voltage and the bulk voltage; and
modulating the inrush limiter impedance to limit the inrush current based on the voltage difference and based on the second zero crossing.

16. The method of claim 15 further comprising:
preventing saturation of a boost inductor based on the inrush limiter impedance.

17. The method of claim 15 further comprising:
deactivating a transistor in the inrush limiter circuit upon detecting the brown-out event.

18. The method of claim 17 further comprising:
reactivating the transistor in the inrush limiter circuit upon detecting the second zero crossing.

* * * * *